No. 712,572. Patented Nov. 4, 1902.
T. R. McKNIGHT & H. A. CLAPP.
DUMP CAR.
(Application filed Apr. 7, 1902.)
(No Model.) 2 Sheets—Sheet 1.
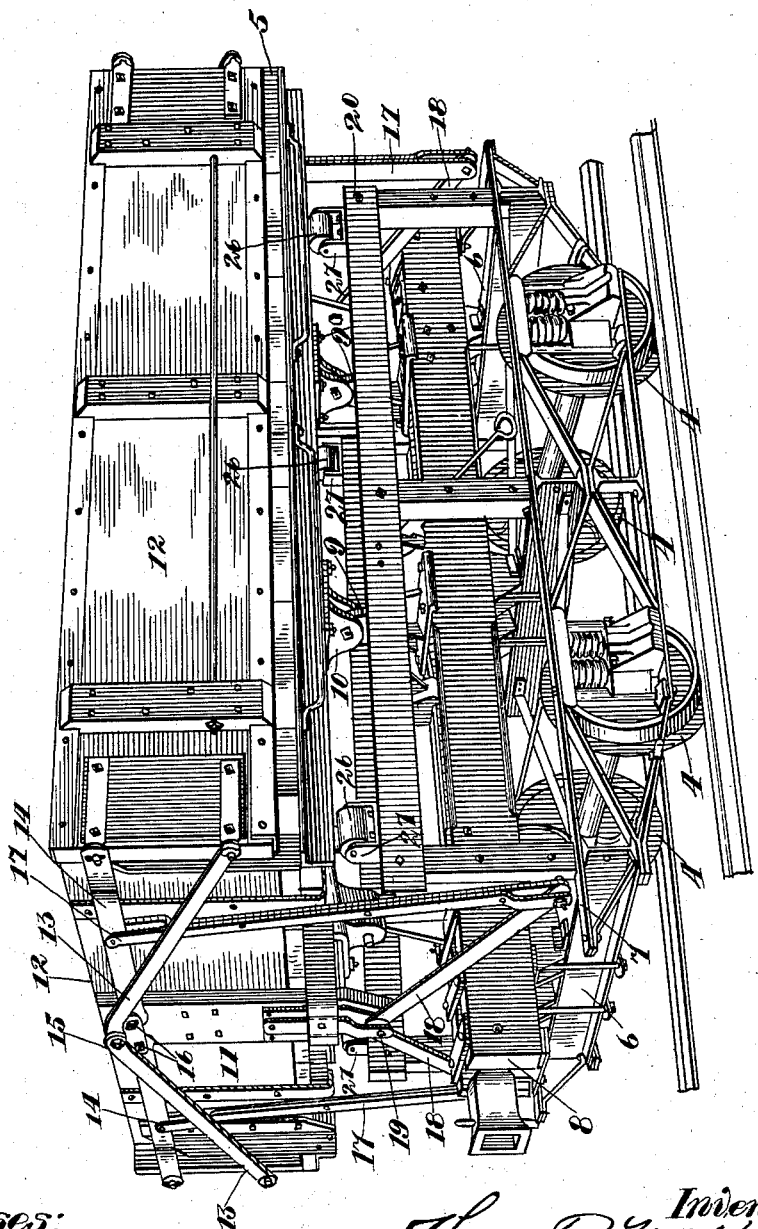

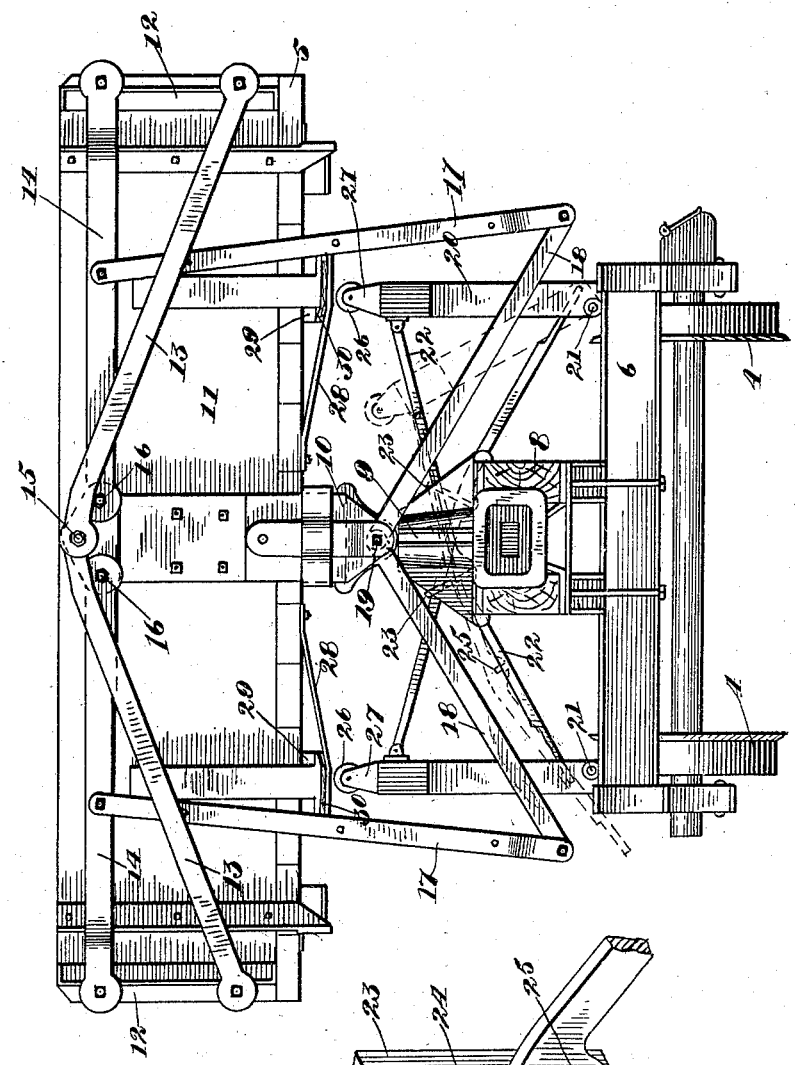

UNITED STATES PATENT OFFICE.

THOMAS R. McKNIGHT AND HIRAM A. CLAPP, OF AURORA, ILLINOIS, ASSIGNORS TO WESTERN WHEELED SCRAPER COMPANY, OF AURORA, ILLINOIS, A CORPORATION OF ILLINOIS.

DUMP-CAR.

SPECIFICATION forming part of Letters Patent No. 712,572, dated November 4, 1902.

Application filed April 7, 1902. Serial No. 101,793. (No model.)

*To all whom it may concern:*

Be it known that we, THOMAS R. MCKNIGHT and HIRAM A. CLAPP, citizens of the United States, residing at Aurora, in the county of Kane and State of Illinois, have invented certain new and useful Improvements in Dump-Cars, of which the following is a specification, reference being had to the accompanying drawings.

Our invention relates to dump-cars of the class or kind having side boards adapted to be raised to discharge the contents of the car when the car is tilted or turned toward one side. In cars of this description the car-body is ordinarily supported pivotally from the draw-bar extending centrally of the truck from end to end and at a considerable distance above the car-truck. Being so supported it is evident that means must be provided for holding the car-body in a substantially horizontal position at all times, except when the contents of the car are to be dumped.

It is the object of our invention to provide means for this purpose which will afford suitable rigid supports under the car-body at the sides thereof and either one of which can be quickly and easily moved to permit of the car-body being turned on its central pivots to dump its load at the side of the car and can as readily be returned to its rigid supporting position after the car-body has been returned to its normal position.

Our invention also comprises means for readily operating such movable supports and for securing them in place.

We accomplish the objects of our invention as hereinafter specified and as illustrated in the drawings.

That which we regard as new will be set forth in the claims.

In the accompanying drawings, Figure 1 is a perspective view of a dump-car embodying our improvements. Fig. 2 is an end view of the car shown in Fig. 1 and showing in dotted lines one of the side-supporting devices partly swung inward to permit the car-body to be turned to dump at that side, and Fig. 3 is a detail illustrating the means employed for locking one of the supports in place.

Referring to the drawings, 4 indicates the wheels of a truck supporting the car-body, the floor of which is indicated by 5. The truck shown is an ordinary steel truck, the end bars of which are indicated by 6 and the sides by 7.

8 indicates an ordinary draw-bar. Upon the draw-bar at suitable intervals is arranged a series of suitable supporting-blocks 9 of any approved form, to which the car-body is adapted to be pivotally secured through the medium of ears 10, projecting from the under side of the floor 5 of the car-body, whereby the car-body may be allowed to be turned to discharge its contents.

11 indicates the fixed ends of the car-body, and 12 the movable side boards thereof. The side boards are each connected to each end 11 by a pair of links 13 14, the links 13 being connected at their inner ends to pivots 15, near the upper edges of the ends 11 and midway the length thereof, their outer ends being connected to the side boards 12, near the lower edges thereof, as shown. The outer ends of the links 14 are connected to the side boards, near the upper edges thereof, and their inner ends are each connected to a pivot 16, arranged at opposite sides of the pivot 15 and slightly below said pivot. It will be understood that each end of the car is provided with a similar pair of the links 13 14. The side boards 12 are raised automatically when the car-body is tilted by means of toggle-levers 17 18, the levers 17 being pivoted to the levers 18 and to the links 14, while the levers 18 are pivotally connected at their inner ends with the car-body by a pivot 19. The construction and arrangement of devices for causing a raising and lowering of the movable side boards is the same as shown in Letters Patent No. 668,927, dated February 26, 1901, granted upon the application of Thomas R. McKnight, and the mode of operation is the same as therein described. For that reason we do not deem it necessary to here describe the same more in detail.

Referring now to our improvements, which of course may be applied to dumping-cars of other constructions than that hereinabove specifically described, 20 indicates two frames, one located at each side of the car-truck and in the form of construction shown extending nearly the full length of such truck. Each frame 20 in the arrangement shown consists of a series of posts of equal height, to the tops of which is suitably secured a cross-bar. Each frame as a whole is pivotally secured to the truck, the pivots being indicated by 21, and the arrangement of the parts is such that the frame can be swung inward or toward the center of the car only. This is accomplished in the construction shown by having the lower ends of the series of posts of the frame rest upon the flat upper face of the side pieces 7 of the truck and locating the pivots near the inner faces of the posts, as shown in the drawings.

22 indicates two rods, each pivotally connected at one end to one of the frames 20 and being of a length to allow its other end to project across the car-truck, where it can be easily reached. The point of pivotal connection of each rod to its frame is preferably about the center of the cross-bar of said frame, and the outer end of the rod is preferably formed with a handle portion, as clearly shown in Fig. 1.

23 indicates a pair of plates fixedly secured to the draw-bar and, as shown, inclined in opposite directions from such draw-bar. Each plate is provided with a slot 24, through which one of the rods 22 passes, the rod in each instance being adapted to engage the plate by means of a notch 25, (see Fig. 3,) formed in the lower edge of the rod. This notch is so located as to engage the plate when the supporting-frame 20, to which it is attached, is in an upright position. The slot 24 in each plate is, as will be seen, of sufficient length to allow the rod passing therethrough to be readily disengaged from the plate. Each rod is also slightly bent, as shown, so as to offer no obstruction to the free tilting of the car-body, such bend being at about the center of the rod to cause the outer or free end to be depressed to about the upper surface of the sides 7 of the truck.

26 indicates rollers suitably journaled upon the top of each supporting-frame 20. In the construction shown there are four short rollers, one near each corner of each supporting-frame and each journaled in a suitable bearing 27, formed, as clearly shown in Fig. 1, of a single piece having upturned ends, between which ends the roller is held.

28 indicates bearing-strips secured beneath the car-body, one being located over each roller 26 and each being secured at its inner end to the under surface of the floor 5 of the car-body a short distance from the longitudinal center of the car and extending downward and toward one side of the car until about over the supporting-frame 20 when such frame is in its upright position and then being continued for a short distance horizontally, the outer end being secured in any suitable manner to a longitudinal piece 29. Interposed between the outer end of each strip 28 and the longitudinal piece 29 is a cushion 30, preferably formed of rubber, which serves to prevent injurious shocks as the car-body turns slightly from time to time on its central pivots while in motion.

With the parts in the position indicated in order to turn the car-body so as to dump a load therefrom to one side the rod 22, that is connected to that supporting-frame 20 at the side where the dumping is to take place, is to be disengaged from its plate 23 by raising it. It is then to be pulled back, drawing with it the supporting-frame 20, to which it is attached, thus leaving the car-body at that side unprovided with any support, so that it may very easily be turned on its central line of pivotal bearings. In turning the system of levers and links shown acts, as fully described in said Letters Patent No. 688,927, to automatically raise the movable side board to permit the load to freely pass from the car. If at the time when it is desired to dump the car the weight of the load causes a slight depression of the car-body at the side where the dumping is to be effected, the provision of the antifriction-rollers 26 on the supporting-frame at that side will be found to be of great assistance, for if such provision were not made it might in many cases be exceedingly difficult to pull such supporting-frame inward on account of the great weight resting upon it. The inclination of the bearing-strips 28 aids materially in this operation, for it will be observed that the weight of the load will cause the rollers to travel inward toward the center of the car, thus insuring the support as a whole being quickly and certainly moved clear of the car-body. In some instances also the antifriction devices and the inclined strips will be found of value in returning the supporting-frame to its upright position.

One very valuable and important feature of our construction resides in the fact that it is absolutely unnecessary in order to move one of the supporting-frames for any workman to be on the side of the car from which the load is to be dumped, thereby to a large extent furnishing protection against injury to those engaged in the work of dumping the car.

That which we claim as our invention, and desire to secure by Letters Patent, is—

1. The combination with a dump-car, of a support beneath the body of the car at the side where the contents of the car are to be discharged, a pivotal connection for said support with the car-truck, a rod connected with said support and extending transversely of the car and provided with a notch, and a fixed engaging device adapted to enter said notch to lock said rod in place and thereby maintain said support in supporting position, substantially as specified.

2. The combination with a dump-car, of a support beneath the body of the car at the side where the contents of the car are to be discharged, a pivotal connection for said support with the car-truck, a rod connected with said support and extending transversely of the car, a fixed plate having a slot through which said rod passes, and means for locking said rod to said plate and thereby maintaining said support in supporting position, substantially as specified.

3. The combination with a dump-car, of a support beneath the body of the car at the side where the contents of the car are to be discharged, a pivotal connection for said support with the car-truck, a roller mounted on the upper end of said support, an inclined bearing-strip secured beneath the car-body, on which the roller is adapted to bear, and means for turning said support, substantially as specified.

4. The combination with a dump-car, of a support beneath the body of the car at the side where the contents of the car are to be discharged, a pivotal connection for said support with the car-truck, a roller mounted on the upper end of said support, a bearing-strip secured beneath the car-body and having a horizontal portion at its outer end over the roller when said support is in an upright position and inclining upwardly toward the longitudinal center of the car, on which strip the roller is adapted to bear, and means for turning such support, substantially as specified.

5. The combination with a dump-car, of a support beneath the body of the car at the side where the contents of the car are to be discharged, a pivotal connection for said support with the car-truck, a roller mounted in the upper end of said support, a bearing-strip secured beneath the car-body, against which the roller is adapted to bear, a cushion between the car-body and the said bearing-strip, and means for turning said support, substantially as specified.

6. In a dump-car, the combination with the car-body, the truck and its draw-bar, of a movable support mounted upon the truck at each side thereof and beneath the car-body, means extending from each support transversely of the car for shifting said supports out of supporting position, and means carried by the draw-bar and adapted to be engaged by the said shifting means for locking said supports in place.

7. In a dump-car, the combination with the car-body, the truck and its draw-bar, of a shiftable support upon each side of the truck and below the car-body, a pair of rods extending transversely of the truck and connected with the supports for shifting them out of supporting position, and plates carried by the draw-bar and adapted to be engaged by the said rods for locking the said supports in position.

8. In a dump-car, a pair of supports for the car-body, a draw-bar, a pair of rods for shifting said supports, and means carried by the draw-bar and adapted to be engaged by the said rods for locking the supports in position.

9. In a dump-car, a pair of movable supports for the car-body, a pair of rods for shifting the said supports, and a pair of plates adapted to be engaged by the said rods for locking the supports in position.

THOMAS R. McKNIGHT.
HIRAM A. CLAPP.

Witnesses:
JULIA M. BRISTOL,
ALBERT H. ADAMS.